United States Patent [19]

Hill et al.

[11] Patent Number: 4,942,833
[45] Date of Patent: Jul. 24, 1990

[54] TURF TREATING PROCESS AND APPARATUS

[75] Inventors: Wallace L. Hill, 110 Willow Dr., Nezperce, Id. 83543; Leonard J. Hill, 805 Warner Dr., Lewiston, Id. 83501; William L. Hill, 501 Beech St., Nezperce, Id. 83543

[73] Assignees: Wallace L. Hill, Nez Perce; Leonard J. Hill, Lewiston, both of Id.

[21] Appl. No.: 265,834

[22] Filed: Nov. 1, 1988

[51] Int. Cl.⁵ .................. A01C 21/00; A01C 23/02
[52] U.S. Cl. ................................. 111/121; 111/138; 111/167
[58] Field of Search ................. 111/6, 7, 1, 85, 87, 111/138; 172/387

[56] References Cited

U.S. PATENT DOCUMENTS

| | | | |
|---|---|---|---|
| 909,991 | 1/1909 | Cole | 111/85 |
| 1,747,525 | 2/1930 | Nagy | 111/85 |
| 2,515,317 | 7/1950 | Schindler | 111/7 |
| 3,602,166 | 7/1971 | Peterson | 111/6 |
| 3,610,184 | 10/1971 | Carroll | 111/7 |
| 3,621,799 | 10/1971 | Erga | 111/6 |
| 3,707,132 | 12/1972 | Hansen | 111/7 |
| 3,797,418 | 4/1974 | Bridger, Jr. | 111/73 |
| 4,172,058 | 8/1979 | Hall | 260/17.4 |
| 4,217,835 | 8/1980 | Fox | 111/85 |
| 4,221,684 | 7/1980 | Antholz et al. | 260/17.4 |
| 4,233,915 | 6/1980 | Kordon | 111/6 |
| 4,407,207 | 11/1983 | Dreyer | 111/85 |
| 4,422,392 | 1/1983 | Dreyer et al. | 111/52 |
| 4,538,532 | 9/1985 | Coker | 111/7 |

*Primary Examiner*—Danton D. DeMille
*Attorney, Agent, or Firm*—Wells, St. John & Roberts

[57] ABSTRACT

A process for treatment of turf by applying a turf treating material in a stream within a narrow slit formed in the turf below the turf growth zone. The slit is made to extend downwardly through the exposed leafy mat in a growth zone and at least part way through the thatch zone situated between the growth zone and a root/soil zone. The slit is formed by a coulter disk rolled in a forward direction of travel with a cutting edge aligned in relation to the forward path to minimize slit. A knife follows the disk to hold the slit open. Turf treating material is placed into the slit directly behind the knife. A skid is used, with the disk extending through slots formed therein to ride over the turf and prevent disruption of the leafy growth, thatch, roots and soil as the slit is being formed. The turf is allowed to close over the placed material thereby capturing the material at a selected depth for maximum effectiveness and to prevent runoff or evaporation of the material.

15 Claims, 6 Drawing Sheets

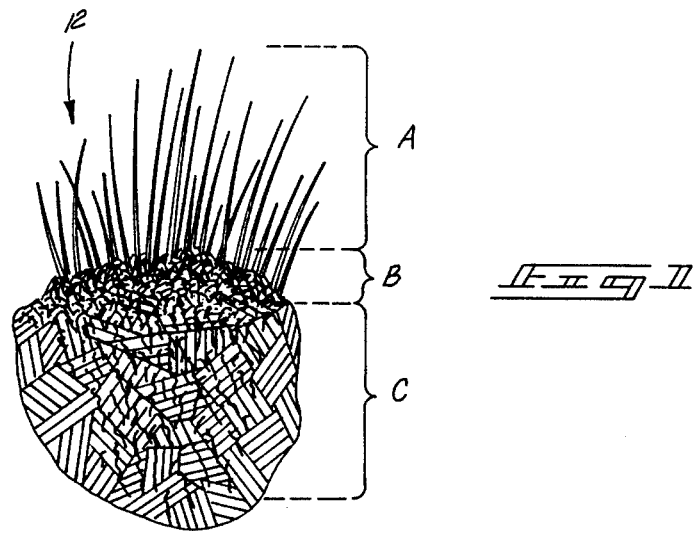
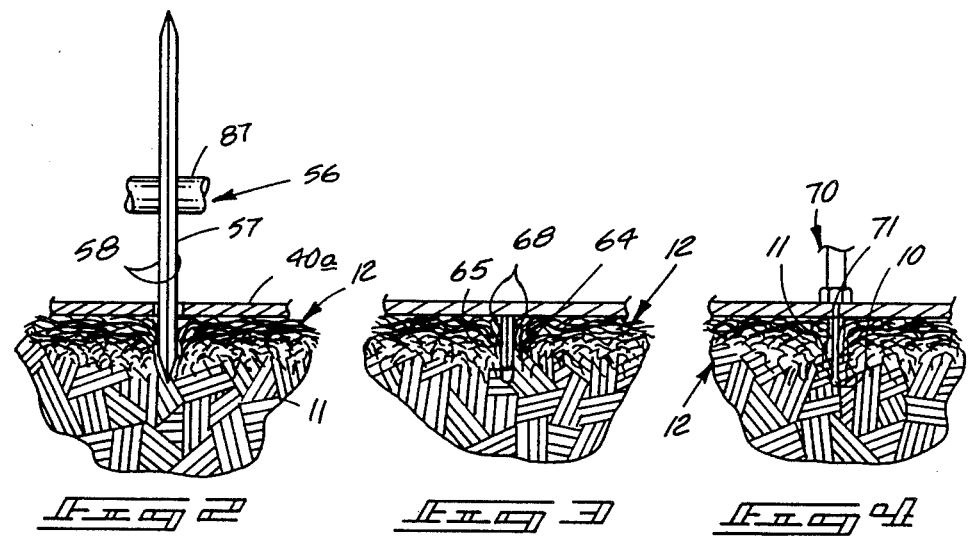
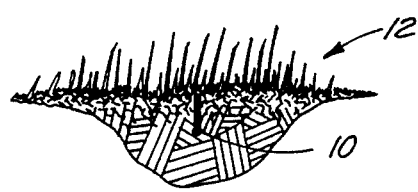

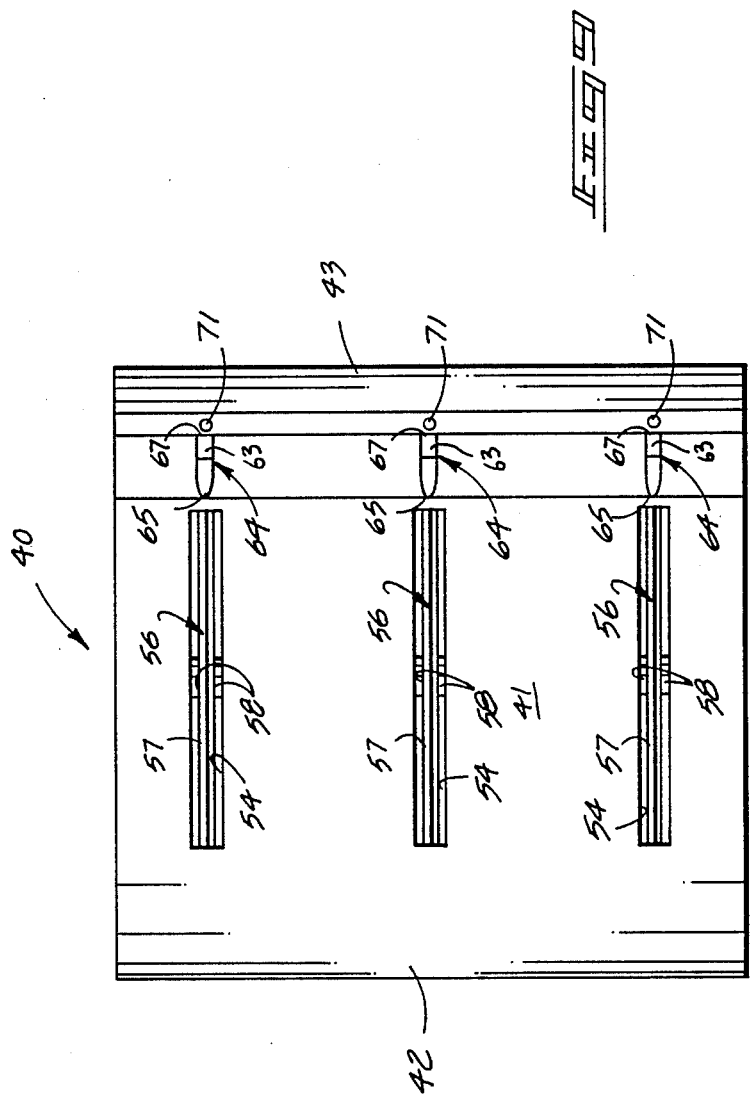

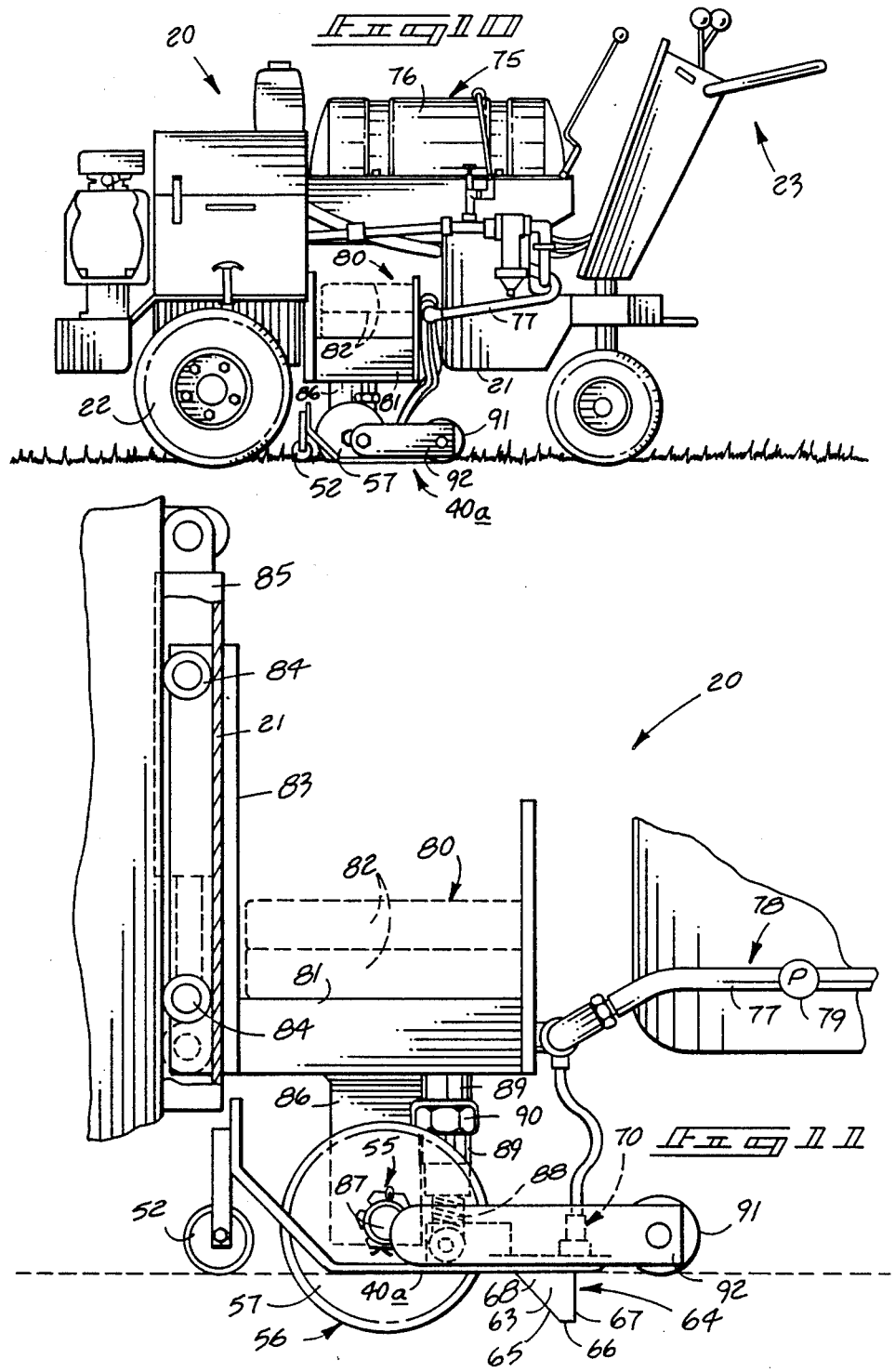

TURF TREATING PROCESS AND APPARATUS

TECHNICAL FIELD

Present invention relates treatment of turf by placement of a material within a slit formed through existing turf cover and at least part way through an underlying thatch zone.

BACKGROUND OF THE INVENTION

Certain chemicals have been developed for the treatment of turf—to fertilize, to control pests and weeds, to encourage thatch decomposition, to "sweeten" the soil and the like. Many of these chemicals are expensive and must be carefully applied to avoid waste. Others are beneficial for their particular use in the turf but can be damaging if allowed to indiscriminately enter the ecosystem by way of evaporation, or migration or run-off during watering.

It is desirable to apply selected chemicals in a judicious, economical manner, minimizing potentially harmful environmental effects. This has nOt been an easy task to accomplish.

It has been found that the most effective manner in which to apply chemicals to turf is to apply the chemical directly to the desired area. This is fairly easy if an above ground, visible leafy growth area is the area to be treated. Standard sprayers or broadcasters are sufficiently effective for such needs. However when roots or thatch areas need treatment, application becomes significantly more problematical. Spray or broadcast chemical spread from above will not easily penetrate through the leafy cover mat to the desired depth. Easy penetration is prohibited because the thatch layer has built up to a substantial thickness and tight consistency. The chemical thus stays on the exposed leafy growth or drops to the top surface area of the thatch where it is easily washed off before proper penetration occurs. Further, some root chemicals are deleterious to the leafy growth by causing "burn" or other unfortunate effects.

Various devices have been developed as attempted solutions to the above problems for penetrating the ground to aid placement of treating materials at selected treatment zones. But most such apparatus are intended for use in agricultural applications where disruption of the ground surface is inconsequential. Such apparatus is not acceptable for use with existing turf.

U.S. Pat. No. 3,602,166 to Peterson, discloses a device for injecting a fluid below the soil surface. The injector includes a number of rotating arms that pierce the ground surface and are intended to be driven to a prescribed depth for injection of a fluid. A similar apparatus is disclosed in U.S. Pat. No. 3,621,799. Steam is introduced into the soil for sterilization purposes. U.S. Pat. No. 4,233,915 to Kordon is of interest to show cultivation of soil by pressurized fluid forced into a subsurface location through use of a number of spaced injector rods.

"Spike" type penetrating applicators as above are difficult to control, to avoid tearing turf as they move along. They also have tendency to provide only "spot" treatment of areas immediately adjacent the area where the spike applicators enter the ground.

Other apparatus have also been utilized to introduce materials into subsurface locations. For example, U.S. Pat. Nos. 4,407,207 and 4,422,392, both disclose seed drills having disk furrow openers for opening a furrow in the ground surface for the purpose of seed planting. The drill is moved along the ground surface and the disk openers are pressed into contact with the ground to produce furrows. Wider openers follow the disks or the disks themselves are angled in order to widen the furrows beyond the thickness dimensions of the disk blades. These patents also disclose use of skids along one side of the furrow opening disk.

The above apparatus may function adequately for seeding in agricultural situations, but they would not function adequately for use in turf since the furrow produced is exaggerated and would produce unacceptable disruption of the existing turf surface. A need therefore has remained for a turf treatment process and apparatus by which chemicals may be placed precisely in the thatch or root zones of the turf without unacceptable disruption of the turf.

BRIEF DESCRIPTION OF THE DRAWINGS

Preferred embodiments of the invention are illustrated in the accompanying drawings, in which:

FIG. 1 is a diagrammatic view of a typical section of turf, as defined by its growth zone, thatch zone, and root zone;

FIGS. 2-5 are diagrammatic views illustrative of the present process for placement of a treatment material in turf below the growth zone;

FIG. 9 is a bottom plan view of a single skid arrangement;

FIG. 10 is a side elevation view of an alternate preferred apparatus;

FIG. 11 is an enlarged side elevation view of the ground working components of the embodiment shown in FIG. 10.

DETAILED DESCRIPTION OF THE PREFERRED EMBODIMENT

Figure 6:
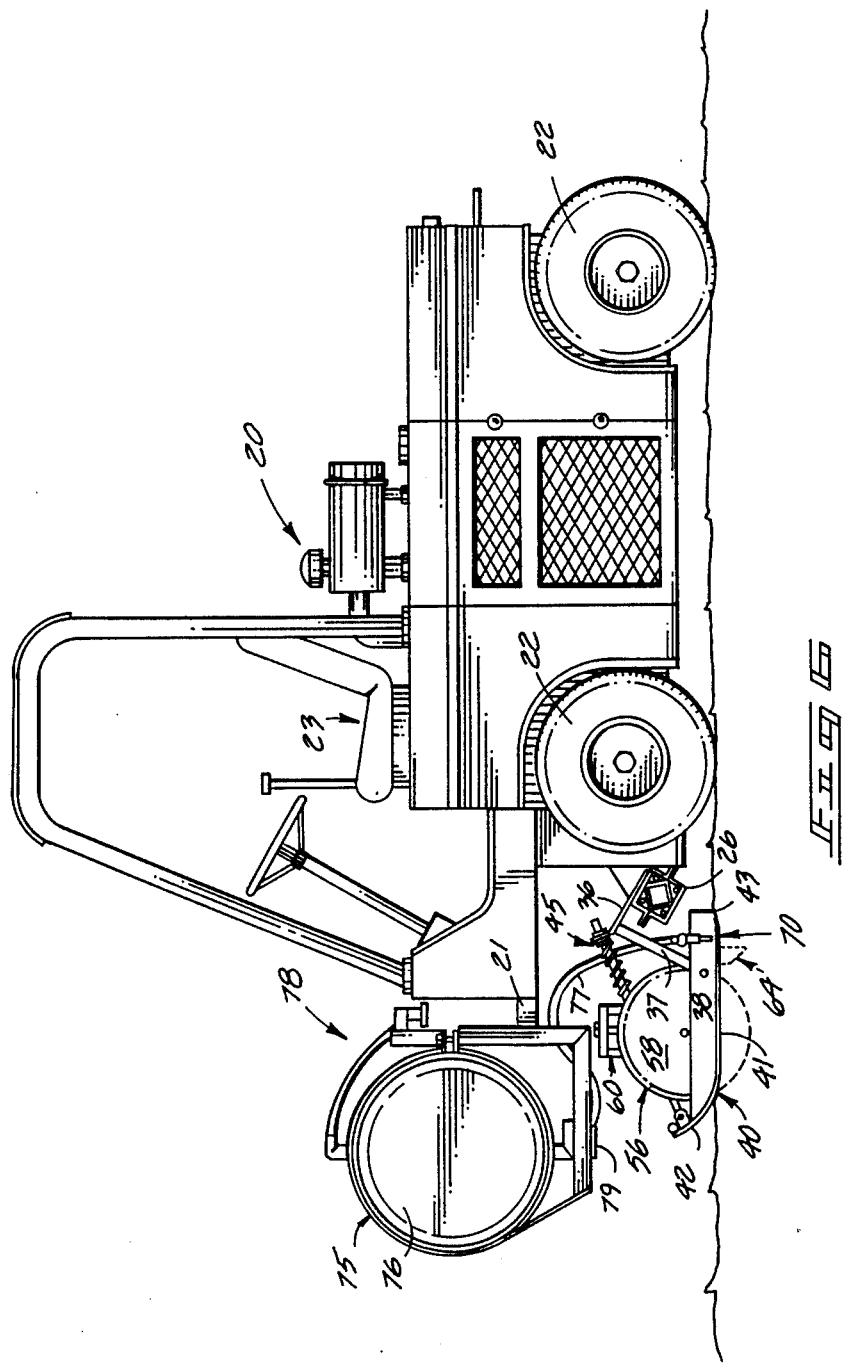
FIG. 6 is a side elevation of a first embodiment self powered turf treating apparatus.
Figure 7:
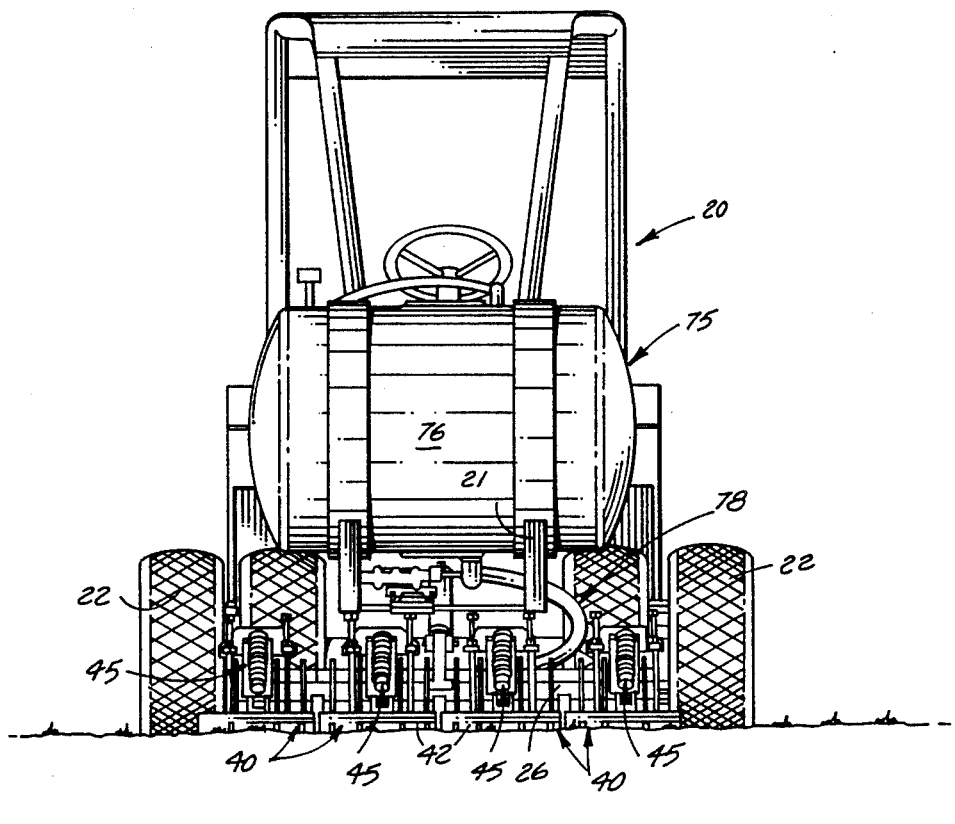
FIG. 7 is a frontal view of the implement shown in FIG. 1.

The following disclosure of the invention is submitted in compliance with the constitutional purpose of the Patent Laws "to promote the progress of science and useful arts" (Article 1, Section 8).

FIG. 1 is illustrative of a typical section of turf 12. For purposes of this description, the turf 12 is defined by a growth zone A which typically includes the visible mat of leafy growth. The turf 12 also includes a thatch zone B. This area is typically made up of stems and clippings blending upwardly into the growth zone and gradually blends downwardly by a process of decay into the soil and root zone C below. The soil and root zone C includes soil and intermingled closely spaced roots supporting the thatch and growth zones above. Often the growth zone A is sufficiently dense to provide a canopy visually hiding zones B and C below. The dimensions of each zone A, B or C may vary considerably from one location to another depending upon soil make-up, water table, type of growth, frequency of mowing, and many other factors. The thatch zone B for example may be nearly nOnexistent in certain conditions and several inches deep in others. Likewise the root zone may be very shallow in surface irrigated areas or very deep where water is drawn to the roots from available ground water.

The thatch zone B, regardless of depth, increases in density from loose, sparsely spaced clippings at the thatch-growth zone interface, to a dense mat of decaying mulch at the thatch-root zone interface. The thatch often presents a barrier to penetration by any materials (including water) applied from above. This characteristic can be detrimental to the plants' health, as the roots and soil below are shielded from needed treatment materials and the decaying material is a haven for harmful insects. On the other hand a certain amount of thatch is beneficial, adding a tactile spring or softness to the turf and holding ground water below the thatch layer against evaporation.

The present process is provided for turf treatment by placing a turf treatment material 10 at a precisely selected location within the thatch zone B or root zone C while minimally disturbing the turf.

The general steps involved in the present method are shown in sequence in FIGS. 2-5. As a first step (FIG. 2) a narrow slit 11 is progressively formed in the turf 12, extending down through the growth zone A and at least part way through the thatch zone B, depending on the material and selected depth for its placement. This is done with minimal disturbance of the turf areas adjacent the slit. The next step (FIG. 3) is to maintain the slit 11 in an open condition (since the turf typically has a tendency to spring back and close the narrow slit). With the slit thus held open, the treatment material is placed (FIG. 4) into the slit 11 below the growth zone. The slit 11 is then allowed to close (FIG. 5) over the placed material.

It is emphasized that the above steps are accomplished while minimally disturbing the growth thatch, roots and soil directly adjacent to the slit. Thus the growth area remains visually and tactilely the same following treatment and the thatch and root interface is minimally disrupted to maintain the advantage discussed above.

More detailed steps involved in the process generally described above will become apparent from the following description of the present apparatus used for performing the various process steps.

Apparatus for forming the slit 11 and placing turf treatment material 10 into the slit is advantageously included in an apparatus 20, two preferred forms of which are generally shown in FIGS. 6 and 10 of the drawings. FIG. 6 is illustrative of a self-propelled machine. FIG. 10 exemplifies a "walk behind" machine. Other forms are contemplated within the scope of this invention, including units for attachment to vehicles such as tractors. Similar elements of both embodiments will be referred to with like reference numerals.

Each apparatus is provided to plane "streams" of material 10 into the turf. The streams are preferably continuous and unbroken. Though this is the preferred stream configuration, it should also be understood that the streams as described herein could also be broken into segments, if so desired.

Both apparatus 20 exemplified herein basically include a mobile frame 21 supported for movement over the ground surface by a plurality of drive wheels 22. The frames 21 support operator stations 23 including appropriate steering and control mechanisms that permit selective movement of the implements over the turf in a preferred forward direction of travel. The forward direction is preferably from right to left as viewed in FIGS. 6 and 10.

Figure 8:
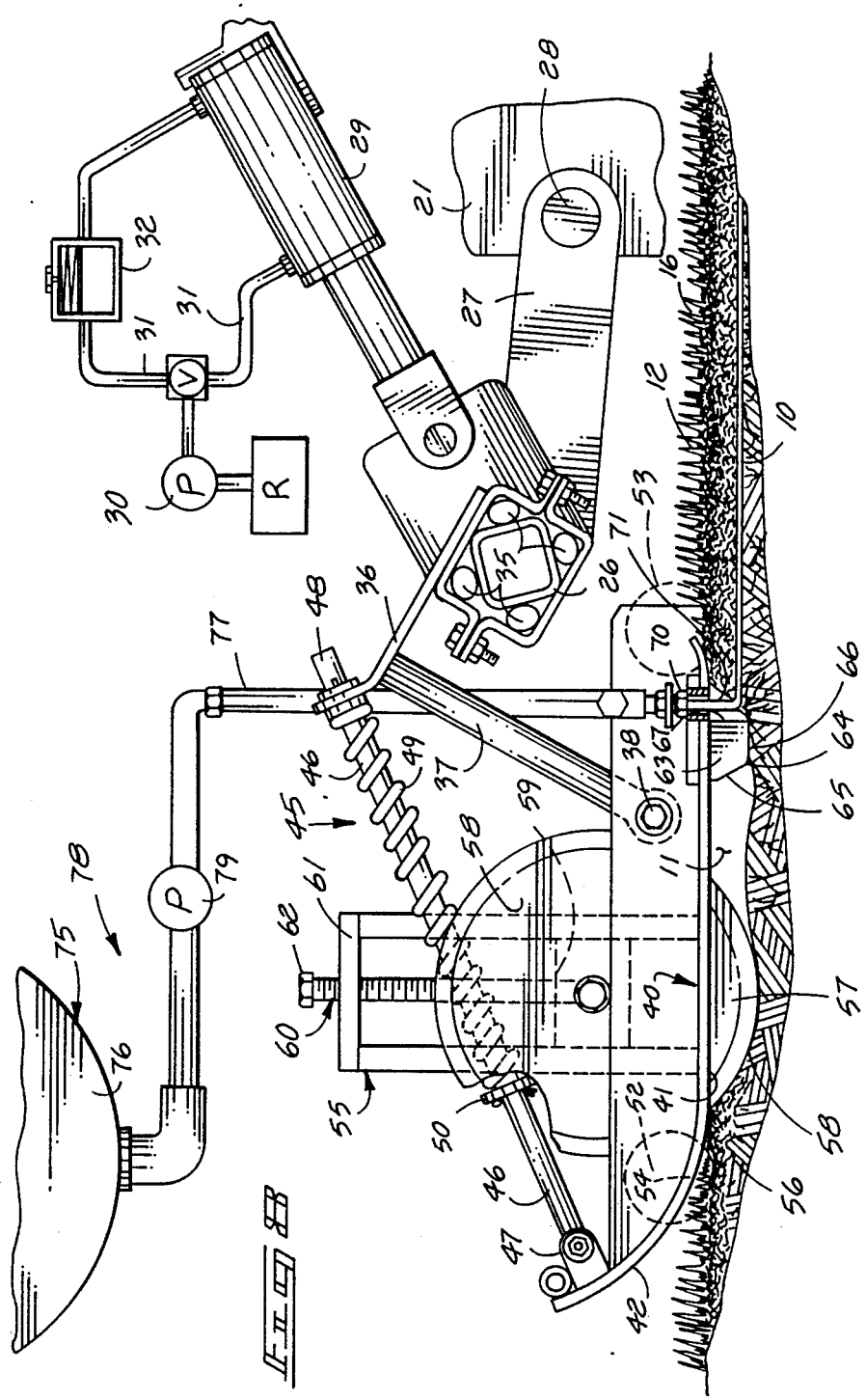
FIG. 8 is an enlarged diagrammatic side elevation detail view of ground working tools of the FIG. 7 embodiment.

In the first form (FIGS. 6-9) the present apparatus includes a main tool boom 26 formed of a rigid bar extending transversely with respect to the forward path of travel. The main boom 26 is mounted to the implement frame 21 by crank arms 27 (FIG. 8). The crank arms 27 extend rearwardly from the main boom and connect at pivots 28 to a forward end cf the frame 21.

In the first embodiment shown, a lift device such as a cylinder 29 FIG. 8) is provided between the implement frame 21 and the main boom 26. Lift cylinder 29 is preferably a double acting hydraulic cylinder driven by an appropriate hydraulic pump 30. Hydraulic lines 31 extend to the cylinder from the pump and preferably from a pressure accumulator 32.

Accumulator 32 can be selectively utilized in the hydraulic line to yieldably urge the cylinder to extend and consequently force the main boom 26 downwardly with a prescribed force. Accumulator 32 may be selected from commercially available accumulator types that receive charging pressure through appropriate fittings. By way of example, the charging or pressurizing material may be nitrogen. Pressurized nitrogen within the accumulator 32 will produce a constant pressure against hydraulic fluid in the connection line 3 . The pressure is transmitted through the hydraulic fluid to the cylinder, thereby causing the cylinder to constantly yet yieldably urge the main boom 26 downwardly.

A mounting apparatus such as rubber bushing mounts 35 are provided along the length of the main boom 26. The rubber bushing mounts 35 each support a bracket 36 extending forwardly therefrOm. A bar 37 is advantageously mounted to each of the brackets 36, extending downwardly therefrom to a pivot end 38.

A number of skid plates 40 are pivotably mounted at the pivot ends 38 of bars 37. Skid plates 40 include relatively flat bottom surfaces 41 for sliding engagement over the growth zone A. It may be noted from FIG. 7 that a number of the skid plates 40 may be provided along the length of the main boom 26.

Each skid plate 40 preferably includes an upturned forward end 42 and extends longitudinally with respect to the forward path of travel to a rearward end 43. The skid plates 40 may be used alone or may be assisted by forward and rearward rollers 52, 53 shown in dashed lines in FIG. 8 to reduce sliding friction over the growth zone A.

The skid plates 40, as shown, are in the form of plates that slidably engage the ground surface However, the term "skid plate" should be broadly construed herein to include other forms such as multiple rollers, elongated conveyor type track arrangements, trades, or similar apparatus (not shown) for slidably or movably engaging the turf growth zone A for the purposes disclosed herein.

A single skid plate pivot suspension assembly of the first embodiment is generally shown at 45 in FIGS. 6 and 8 of the drawings. A similar pivot suspension assembly may be provided for each of the skid plates 40. The suspension assembly 45 may be comprised of a rod 46 on each skid plate extending from a pivot 47 toward the associated bracket 36. A rearward end 48 of rod 46 extends slidably through the bracket 36. A compression spring 49, received over the rod, is engaged between the bracket 36 and an adjustable collar 50 along the length of the rod. The collar 50 is selectively adjustable along the length of the rod 46 to selectively act against the yieldable spring 49 upon rearward motion of the rod. Thus, the suspension assemblies 45 selectively resist upward tipping motion of the skid plates 40 as rooks or irregularities are encountered while the apparatus is moved in the forward direction of travel. Resistance to upward tipping motion of the skid plates is adjustable by selectively positioning the collars 50 along the rods 46.

Each skid plate 40 is provided with a number of longitudinal coulter disk receiving openings or slots 54 (FIG. 9). The number of openings 54 is equal to the number of coulter disks 57 provided on each of the skid plates 45. In the example shown, three openings 54 are provided in each of the skid plates 45, each for receiving an individual cutter means 56. The openings 54 include side walls spaced closely adjacent opposed side surfaces 58 of coulter disks as means for minimizing disturbance of the turf while the disks are moved through the turf.

Circular coulter disks 57 exemplify a preferred form of a cutter means 56 in both embodiments shown for progressively forming openings in the turf 12 at a prescribed depth. The cutter means 56 could alternatively be a powered cutting blade (not shown), driven to rotate or vibrate in order to produce the slit 11. Coulter disks 57 are preferred for ease of manufacture, reliability and simplicity of operation.

The preferred coulter disks 57 are rigid, each including a relatively narrow axial width dimension between opposed parallel disk faces 58. Though disk diameter and thickness dimensions may vary, coulter disks having external disk diameters of approximately 10 inches and axial disk width dimensions of approximately 0.079 inches have been used effectively to produce narrow slits 11 through turf 12 such as commonly found on golf courses.

Mounting means 55 is provided in both embodiments to mount each coulter disk 57 in an upright position for relatively free rotation about an axis that is transverse to the forward path of travel. The relatively flat disk face surfaces 58 are therefore substantially aligned with the forward path of travel, so the thickness dimensions of the disks determine the widths of the resulting slits 11.

The mounting means 55 in the first embodiment also includes provisions for elevational depth adjustment of disks on each skid 40. In the first embodiment, the disks 57 on each skid are mounted by take-up bearings 59 through an adjustment means 60 on the associated skid plate 45. The adjustment means 60 preferably includes an upstanding adjustment bracket 61 which slidably carries the take-up bearing 59. The bearing is slidably adjustable elevationally along the bracket 61 by means of an appropriate bolt adjuster 62. Rotation of the bolt adjuster 62 will cause corresponding elevational movement of the associated disks 57 with respect to the associated skid plates 40. The adjustment means 60 will permit selective adjustment of disk cutting depth below the skid plates 40.

In both embodiments, a knife means 64 is preferably aligned immediately behind each coulter disk 57 for holding the slits open. Each knife means 64 may be comprised of a rigid blade 63 extending substantially vertically downward from the bottom surface 41 of the skid plate. The blades 63 are approximately equal in thickness dimension between side surfaces 68 to the forward coulter disks 57 and are aligned with the disks in relation to the forward path of travel. Side surfaces 68 serve to engage opposed side edges of the slit 11 to hold the slit open as the apparatus is moved forward.

Each blade 63 includes a forward edge 65 leading downwardly to a bottom end 66. Each blade 63 will also include a substantially upright back edge 67 spaced rearwardly from the forward edge 65.

It may be noted from FIGS. 8 and 11 that the illustrated bottom blade edge 66 does not extend as deep into the turf as the adjacent coulter disk 57. In fact, the knife means may be provided in even shorter depths since they are used simply to hold the slit 11 open (zones A and B temporarily apart) as it was initially formed by the coulter disk 57. Actual cutting depth of the blades 63 may be varied depending upon the desired depth for the opening 11 and the depth setting for the coulter disks 57.

The knife means 64 may be removably mounted to the skid plates by appropriate conventional fastener means such as bolts, screws, etc. for replacement due to wear or to enable substitution of knives of different lengths.

Both embodiments also include a nozzle means 70 on the skid means rearward of an in alignment with each cutter means 56 and knife blade 63. The nozzle means 70 includes a discharge 71 for each disk 57. Nozzles 70 are configured to discharge spaced, continuous or discontinuous streams of material 10 as shown in FIG. 8 and in cross section in FIGS. 4 and 5. Nozzle opening diameters may vary according to the nature of material being placed and the application pressure and rate requirements.

The nozzles 70 define discharge points that are located upwardly adjacent to the growth zone A and that are aligned behind the coulter disks 57 to facilitate desired placement of the turf treatment material in streams within the slits 11.

The nozzle means 70 are preferably attached to the skid plates with the openings thereof situated at the growth zone level A. The turf treating material may be injected, blown, or dropped from the nozzles directly downward into the slits 11 behind the knife means 64.

It is preferred that there be a minimal distance between the upright back edges 67 of the knife means 64 and the nozzle discharge openings 71 to assure proper placement of the material stream.

Turf treating material 10 is delivered to the nozzles 70 from a container means generally shown at 75. The container means may be provided in the form of a tank or hopper 76 mounted at the forward end of the implement frame 21. Tank capacity is selected according to the quantity of material to be applied.

Delivery means generally shown at 78 in FIGS. 8 and 11 is provided to deliver turf treating material 10 from the tank or hopper 76 to the nozzles 70. The delivery means 78 may advantageously include an injector means such as a pump 79 on the implement frame 21. The pump 79 receives and delivers material 10 through tubes 77 extending between the pump and the nozzles 70. The pump 79 may be a conventional centrifugal, roller, or piston type pump. The pump 79 could further be a form of auger or extruder. The pump 79 may be operated at various pressures sufficient to produce continuous streams of material at the nozzles 70. Working pressures may be used according to the form of pump used, the material mixture and nozzle orifice size.

In the walk behind embodiment shown in FIGS. 10 and 11, a single skid 40a is used with a multiple of coulter disks 57 and knives 63 spaced along the length thereof. A material dispensing nozzle 70 is supplied behind each knife 63.

This embodiment makes use of an alternate means 80 for pressing the skid 40a, disks 57 and knives 63 downwardly against the turf, in place of the accumulator arrangement 32 shown and described above. Either form may be used in either machine to achieve the effect of pressing the cutters into the turf and pressing the turf downward about the slits being formed.

Specifically the means 80 includes a weight tray 81 adapted to carry a selected number of weights 82. The number of weights selected and placed on the tray 81 may be varied according to turf conditions encountered.

The weight tray "floats" elevationally on the frame 21 by a guide mechanism including on a or more upright guide bars 83 mounted to and extending upwardly from the weight tray. Rollers 84 are provided to maintain free rolling contact between the frame 21 and guide bar. The rollers and frame allow the weight tray to move elevationally but prevent lateral or backward-forward movement relative to the frame. The weight tray 81 is thus allowed to bear down against the tools below while the apparatus is in operation.

A cylinder 85 is also provided to selectively elevate the weight tray 81 and the tools attached below to an elevated transport position. The cylinder 85 interconnects the frame 21 with the weight tray. As the cylinder is retracted, the weight tray and tools are raised to ar inoperative transport position above the turf. When allowed to extend, the cylinder allows the weight tray 81 and attached tools to move downward to engage and move along the turf in the operative condition shown.

The weight tray bears against the disks through one or more downwardly projecting posts 86. An axle shaft 87 of disk mounting means 55 is rotatably mounted to the posts 86 and mounts the disks for common rotation. Thus the weight of the tray is borne directly by the disks.

A depth adjustment mechanism mounts the skid 40a and attached knives 63 and nozzles "0 to the weight tray. Threaded studs 88 (FIG. 11) extend upwardly from the skid plate through guide sleeves 89 on the posts 86. Adjusting nuts 90 threadably engage the studs 88 between the sleeves 89. The nuts 90 may be selectively rotated to raise or lower the skid plate 40a in relation to the disks 57 to thereby selectively adjust the depth of cut (defined by the distance the disks project through and below the skid plate).

The above mounting and adjusting arrangement may be reversed for example, so the disks and axle would be rotatably mounted to the studs for elevational adjustment in a manner somewhat similar to the arrangement shown in FIG. 8. The skid 40a would then be directly mounted to the posts 86. Either mounting arrangement will function equally well.

Either unit shown may also make use of a freely pivoted roller 91 mounted on swing arms 92 to trail behind the skid plate(s) for the purpose of assuring return of the turf to its pre-existing surface configuration following placement of the treatment material.

OPERATION AND PROCESS

Details of the present process will be given in conjunction with description of operation for both forms of the present apparatus as described in detail above.

In general, as briefly indicated above, the present process involves the basic steps of progressively forming a slit in the turf extending below the growth zone A, and holding the slit open while placing the turf treating material therein, and allowing the slit to close. The deposited material stream 11 is thus positioned below the growth zone, A in order to affect the thatch, roots or soil directly.

The step of forming the slits to a prescribed depth in the turf is advantageously accomplished by moving the implement 20 forwardly while pressing the coulter disks 57 downwardly to cut through the growth zone A and at least partially through thatch zone B to the prescribed depth. This is accomplished firstly by lowering the coulters into con&act with the ground surface. To this end, the cylinder 29 of the first embodiment is operated by hydraulic pump 30 to lower the main boom 26 along with the attached coulters 57 and skids 40 into contact with the ground surface. This step is preferably performed while the implement is moving in a forward direction of travel so the coulters will progressively cut through the soil surface to the desired depth as the implement moves forwardlY. The depth of cut, of course, will have been previouslY selected bY adjustment of the individual bolt adjusters 62 for the various coulter disks 57. In the walk behind version, the skid is lowered simply by allowing the cylinder 85 to extend.

Depth of the out made is accomplished by selectively adjusting the relative elevators of the disks and skids using the mechanisms disclosed above. The slit depth is selected according to the nature of the turf and the treating material being used. By way of example, a turf treating pesticide for destroying certain harmful insects that attack the roots and stems would preferably be placed within the thatch zone B toward the root zone C. Adjustments would thus be made to extend the slits down through the growth zone A and well into the thatch zone B to facilitate application of the pesticide directly to the area occupied by the harmful insects.

A different depth may be selected for, say, fertilizer or herbicide placement where it may be desirable to locate streams of the selected material more in the root zone C. Still other depth adjustments may be made in order to place material at the most effective depth below the growth zone A. The slit depth may therefore vary according to need but will always extend downward through the growth zone A and at least part way through the thatch zone B. This is done to assure that the material will be captured and held within the slits and not be placed on top of growth zone A. The thatch and growth will thus close over the slits following placement of the material, covering it against undesirable run-off, migration or evaporation. The material is also clear of the leafy growth in the growth zone, where contact could cause leaf damage.

Once the skids have been lowered, the accumulator 32 or weight tray 81 function to yieldably urge the skids 40 and coulters 57 downwardly. In the first preferred form the accumulator 32 will allow upward deflection of the coulters 57 and skids 40 should objects such as stones or uneven terrain be encountered. This is due to the compressible nature of the gas included within the accumulator 32. The accumulator 32 and the cylinder 29 therefore function to provide yieldable downward force against the coulter disks 57 and skids 40 to maintain them in contact with the ground surface and to urge the coulter disks 57 yieldably downward to cut through the ground surface as the implement progresses forward. In the walk behind version the weight tray will press the tools mounted downward against the turf but will allow the tools to deflect upwardly by provision of the guide rollers 84.

The slit 11 formed by each coulter disk 57 is formed progressively as the implement moves forwardly. Each coulter disk 57 rotates about an axis that is above the ground surface and perpendicular to the forward path of travel. This is done so the width of each slit will be defined only by the leading edge and axial thickness dimensions of the disks 57 as they roll along. Each slit 11 should therefore be no wider than the thickness of a disk (preferably about 0.079 inches).

The individual disks will roll along the ground surface, cutting into the turf to the prescribed depth. This is done with minimal drag due to the narrow width of the individual disks 57 and their aligned relationship with the forward path of travel.

The skid plates 40, 40a slide along over the ground surface in close proximity to the rotating coulter disks. Edges of the coulter disk receiving slots 54 of skid plates 40, 40a function during this time to minimize disruption of the adjacent ground surface. The skid plate opening edges 54 are located closely adjacent opposite faces 58 of each coulter disk to strip the disks of any soil lifted upwardly from the ground surface. A clean, narrow slit 11 is thereby formed behind each of the individual coulter disks 57 for receiving the stream of material 10.

Preferably, the slits 11 formed by the cutter means are spaced apart equally from one another and are parallel. Spacing of 3 inches to 6 inches between adjacent disks has been found effective in turf.

As the skid plates 40, 40a move forwardly over the ground surface, objects encountered will be either pressed into the ground or the skids will ride over the objects. This action is permitted through the yieldable nature of the skid suspensions described above.

In the second embodiment and alternatively in the first embodiment, rollers 52 may be provided to aid the skid plates 40 as indicated by dashed lines in FIG. 8. The forward roller 52 may reduce frictional drag of the skid. The additional rearward roller 53 (FIG. 8) may also be provided to reduce drag. Conceivably, an additional number of other rollers (not shown) could also be provided as an equivalent of the skid plates 40, 40a. Such rollers would preferably span the distance between rollers 52 and 53. They would also function to gauge the depth of the cutters, pressing against the ground surface adjacent the coulters and stripping collected soil from the rolling coulters.

As the implement proceeds, the slits 11 formed by the cutter means 56 are maintained open by the knife means 64. The knife blades 63 follow along behind the coulter disks 57 and are aligned therewith to substantially hold the slits 11 open as they would otherwise likely close behind the coulter disks due to the typical spongy nature of turf, in the growth and thatch zones A, B.

The step of dispensing the turf treating material in a stream into the slits is performed preferably by injecting the material from the tank 76 through the nozzles 70 and into the slits 11.

As a final step the turf is allowed to close over the placed material 10. This step is accomplished effectively in part due to the narrow width of the slit and the compressive forces of the skid following the nozzles 70. The roller 91 further enhances this action. The coulter disks produce such narrow slits 11 and the slits close so completely and without turf disruption that the apparatus can be effectively used even on golf putting green turf without seriously disrupting the putting surface. The exposed surface of the turf remains smooth due to the narrow slits 11, and to the skids in providing surfaces on opposite sides of the coulters and knives 65 to prevent the coulter surfaces 58 and knives from lifting engaged soil materials above the turf 12. Thus the turf surface remains smooth and without disruption and the material is placed for maximum utilization below the growth zone A and will not migrate or be easily washed away.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A process for subsurface treatment of turf which includes an above surface exposed growth zone having a mat of exposed plant leaf growth, a thatch zone between the exposed growth zone and a root zone containing closely spaced intermingled roots and soil while minimizing disruption of the turf, comprising the steps of:

forming a narrow slit in the turf by moving a single circular coulter disk, rotatable about a horizontal axis and having opposed substantially planar side surfaces, in a forward direction of travel with the disk rolling and cutting into the turf to form the slit through the mat at the growth zone and to a depth at least part way through the thatch zone, the slit opening upwardly at the exposed growth zone;

moving a skid plate with the coulter disk, the skid plate having a bottom surface sliding in contact with the turf and having an opening therein receiving a portion of the disk and with side walls of the opening positioned closely adjacent to the opposed side surfaces of the disk, thereby holding the turf as the disk cuts through the turf and cleaning the disk and maintaining the turf along side the slit as the disk cuts through the turf;

pressing the skid down against the turf, thereby holding the turf firmly as the disk cuts into the turf such that the slit is formed with minimal disturbance of the turf by the coulter disk;

moving a knife rigidly mounted to the skid plate and projecting from the bottom surface thereof, with a cutting edge aligned with and behind the coulter disk to extend into the slit to a depth no greater than the slit depth along the forward path of travel and with knife side surfaces behind the cutting edge thereof holding the slit open to the width of the slit formed by the disk thereby maintaining the slit in an open condition with minimal disturbance of the turf by the knife; and placing a turf treating material into the upwardly open slit below the growth zone through an opening in the skid plate aligned with and immediately behind the knife;

providing the knife, the coulter disk, the side plate and the opening in the skid plate in relation to one another and moving them together in relation tot he turf in the forward direction of travel in such a manner that the slit formed by the coulter disk will close together over the placed turf treatment material, with the material being covered and retained by the turf below the growth zone and with the turf returning substantially to its original state.

2. The process for treating turf as defined by claim 1 wherein the step of placing a turf treating material is accomplished by injecting the material into the slit behind the knife.

3. The process for treating turf as defined by claim 1 wherein the step of mounting the coulter disk includes adjustably positioning the coulter disk in relation tot he skid to vary the depth of cut for the disk portion projecting through the narrow opening below the skid.

4. The process for treating turf as defined by claim 1 wherein the step of placing a turf treating material is accomplished by applying a pesticide into the thatch zone within the slit.

5. The process for treating turf as defined by claim 4 wherein the pesticide is applied by injecting the pesticide under pressure downwardly into the slit.

6. The process for treating turf as defined by claim 5 wherein the step of injecting the pesticide is accomplished by positioning a nozzle at the growth zone, aimed downwardly into the slit and by forcing the pesticide out through the nozzle.

7. The process for treating turf as defined by claim 1 by extending the slit into the root zone and by applying the material into the slit for access by the roots.

8. Apparatus for treating turf which includes an above surface exposed growth zone having a mat of exposed plant leaf growth, a thatch zone between the exposed growth zone and a root zone containing closely spaced intermingled roots and soil, comprising:
   a narrow coulter disk, rotatable about an axis for forming a narrow width slit in the turf while moving in a forward direction of travel, the slit opening upwardly at the exposed growth zone and extending downwardly to a depth at least part way into the thatch zone;
   a skid plate associated with the coulter disk, having an opening receiving a portion of the disk and with side edges adjacent the coulter disk and a bottom surface for sliding contact with the turf at the growth zone for minimizing disturbance of the turf along side the disk thereby holding the turf as the disk cuts through the turf and cleaning the disk and maintaining the turf alone side the slit as the disk is moved along to form the slit;
   a knife rigidly to the skid plate and aligned with and behind the disk for maintaining the slit in an open condition at a width no greater than the slit width cut by the disk and extending to a depth no greater than the depth of the slit formed by the disk as the disk is moved along the forward path;
   means for placing a turf treating material into the upwardly open slit below the growth zone; and
   wherein the means for placing turf treating material is closely spaced behind the knife such that the slit will close together over the placed turf treating material with the material being covered and retained by the turf below the growth zone and with the turf retaining substantially to its original condition.

9. The apparatus of claim 8 wherein the coulter disk is comprised of
   a planar coulter disk plate rotatable about an axis transverse to the forward path of travel and having a cutting edge for rotatably engaging and cutting through leaf growth, thatch, roots and soil to form the slit, and
   wherein the knife includes a cutting edge aligned with the coulter disk in relation to the forward path of travel.

10. The apparatus of claim 8 wherein the the skid projects rearwardly of the knife in relation to the forward path of travel.

11. The apparatus of claim 8 further comprising means for yieldably biasing the coulter disk and knife downwardly into the turf to a selected depth.

12. The apparatus of claim 18 wherein the means for yieldably biasing the coulter disk and knife is comprised of hydraulic means and drive means operating the hydraulic means to selectively urge the coulter disk and knife downwardly.

13. The apparatus of claim 11 wherein the means for yieldably biasing the coulter disk and knife is comprised of weights operatively connected to the coulter disk and knife means.

14. THe apparatus of claim 8 further comprising roller means behind the means for placing turf treating material for pressing downwardly against the turf following application of the treatment material.

15. The apparatus of claim 14 wherein the roller means is comprised of a roller mounted to the skid plate for independent elevational movement in relation to the coulter disk.

* * * * *